United States Patent [19]
Gibson

[11] 3,874,590
[45] Apr. 1, 1975

[54] MOISTURE RESPONSIVE APPARATUS FOR CONTROLLING MOISTURE CONTENT OF SOIL

[76] Inventor: William H. Gibson, 13882 Tustin East Dr., Apt. 70, Tustin, Calif. 92680

[22] Filed: Oct. 19, 1973

[21] Appl. No.: 407,928

[52] U.S. Cl............................ 239/63, 61/13, 73/73, 137/78
[51] Int. Cl............................................. A01g 27/00
[58] Field of Search......... 239/63; 73/73; 61/12, 13; 137/78

[56] References Cited
UNITED STATES PATENTS

| | | | |
|---|---|---|---|
| 3,204,872 | 9/1965 | Whear | 239/63 |
| 3,244,372 | 4/1966 | Hanner | 239/63 |
| 3,512,712 | 5/1970 | Benesch | 239/63 |
| 3,642,204 | 2/1972 | McCloskey | 239/63 |
| 3,747,399 | 7/1973 | Treirat | 239/63 X |

Primary Examiner—Robert S. Ward, Jr.
Assistant Examiner—Michael Mar
Attorney, Agent, or Firm—Schapp & Hatch

[57] ABSTRACT

A moisture responsive apparatus is disclosed for automatically controlling the operation of a soil irrigation system. The apparatus includes a moisture sensor having a perforated tubular sensing element adapted to be placed in contact with or in proximity to the soil and made of a material, such as nylon, that absorbs moisture and thereupon expands in accordance with the amount of moisture absorbed. The expansion and contraction of the sensing element relative to a member whose dimensions are unaffected by moisture are used to operate a pilot valve which in turn supplies a small control flow that actuates an irrigation system valve means. The sensing element and related member may have substantially the same coefficient of thermal expansion to compensate for dimensional changes due to temperature variations, and further may be adjustably coupled to permit setting the moisture content operating limits of the pilot valve. The sensing element may comprise a plurality of concentric, serially connected sensing tubes to increase the sensitivity of the sensing element for a given overall length. The sensing element may furthermore include reinforcing ribs projecting from the exterior surface thereof and may further be isolated from direct contact with the soil by means of a moisture-permeable screen disposed about the element but out of contact therewith.

56 Claims, 10 Drawing Figures

MOISTURE RESPONSIVE APPARATUS FOR CONTROLLING MOISTURE CONTENT OF SOIL

BACKGROUND OF THE INVENTION

1. Field of the Invention

This invention relates generally to apparatus for controlling the moisture content of soil and particularly to irrigation system control devices incorporating moisture sensor elements whose dimensions vary as a function of soil moisture content.

2. History of the Prior Art

Irrigation systems which irrigate for predetermined periods at regularly timed intervals are well known. These systems, however, being unresponsive to variables such as rainfall and humidity levels, tend to either under- or over-irrigate the soil. The ultimate soil irrigation system from the standpoints of economy, optimum plant water requirements and efficient usage of water resources is one whose operation depends directly upon the moisture content of the soil. Irrigation systems of this type are presently in use but have certain disadvantages.

In one such system, irrigation takes place only during predetermined portions of timed cycles if the soil requires it. A moisture sensor detects changes in the conductivity of the soil and provides an electrical timer and an input whose magnitude determines whether irrigation will take place during the next cycle. These systems, however, are expensive, their operation is dependent upon the measurement of conductivity which is greatly influenced by variables other than moisture content, and they are subject to the constraint of being usable only with a timer to start and control the period of irrigation. Moreover, in many agricultural regions electrical power is not readily available for operating remote field installations.

The prior art also includes systems which attempt to irrigate solely upon demand and which utilize moisture responsive actuators that are mechanical in nature. These actuators employ moisture sensitive elements, typically of wood, placed in contact with the soil. Such elements expand as they absorb moisture and contract upon drying and these dimensional changes are used to directly operate an irrigation system shutoff valve. However, actuators of this type have many disadvantages that make their utilization in irrigation systems unacceptable. There are marked variations, for example, in the moisture absorbing properties of different species of wood. Even samples of the same species exhibit varying degrees of sensitivity to moisture so that actuators employing wood and having consistent, repeatable and uniform operating characteristics are impossible to manufacture on a commercial basis. Moreover, even species less prone to deterioration, such as redwood, have relatively short useful life spans when buried in moist soil.

The response time of prior art mechanical sensors to moisture changes is furthermore exeedingly slow, being measured in terms of hours rather than minutes as desired. Although this is not too critical during the drying phase, once irrigation has begun the sensor moisture condition should not be more than a few minutes behind the soil moisture condition in order to be effective in obtaining the desired degree of moisture control.

Moreover, dimensional variations of the prior art mechanical moisture responsive elements are too small to directly operate irrigation system shutoff valves. This, in combination with excessive time lag in responding to changing soil moisture conditions, results in nonpositive operation of the shutoff valve. Once the opening moisture condition is reached, the valve starts leaking water and almost immediately the closing cycle, which may last several hours, begins. The result is unresponsive, ineffective irrigation at a low flow rate with large overshoots in moisture control.

SUMMARY OF THE INVENTION

In accordance with one aspect of the present invention, there is provided a moisture responsive sensor unit adapted to be embedded in the soil whose moisture content is to be monitored and controlled. The unit includes a tubular sensing element fabricated of an expansible, moisture-absorbing material, such as nylon, which renders the element highly sensitive to even minute changes in the moisture level of the soil with minimal time lag. Disposed at least in part within the tubular sensing element and coupled thereto is a member whose dimensions are substantially unaffected by moisture. The displacement of a portion of the sensing element relative to the member is a measure of the moisture level of the surrounding soil and may be used to actuate an irrigation system control device.

Another aspect of the invention is the use of the above-described sensor unit to actuate a pilot valve to provide a small volume, hydraulic pressure signal for operating an irrigation system valve means such as a shutoff valve controlling water flow to one or more sprinklers or irrigation nozzles. Such valve means requires only a small volume hydraulic pressure signal to fully open and the absence of such signal causes the valve means to return to its fully closed position. The pilot valve itself is highly sensitive, requiring only a small elongation of the sensing element for actuation and establishment of the control flow. There is thus provided a mechanical moisture sensing device that can precisely and economically control the moisture content of the soil on a demand basis in a positive manner.

The invention also covers various constructional features of the sensor unit. According to one such feature, providing temperature compensation, the sensing element and member coupled thereto are made of materials having substantially the same coefficient of thermal expansion in order that the relative displacement of the sensing element and member will be a function of moisture level only.

The tubular sensing element is preferably perforated to expose the interior surface thereof to essentially the same moisture level as the exterior surface to enhance the repidity of response of the sensing element. Further in this connection, the space between the tubular sensing element and the enclosed member may be substantially filled with an absorbent material.

The sensing element and enclosed member may be adjustably coupled so that their relative positions may be preset thereby predetermining the moisture levels at which the pilot valve is opened and closed.

According to another aspect of the invention, the sensing element comprises a plurality of concentric sensing tubes joined to provide an amplified sensing element displacement for a given sensing element length, the extent of amplification being a function of the number of sensing tubes employed.

Also in accordance with the invention, the tubular sensing element may be enclosed within a cylindrical screen whereby an annular isolation space is defined between the sensing element and screen. The screen functions to prevent direct contact between the soil and sensing element with the result that essentially all hysteresis producing frictional and binding forces between the soil and sensing element are eliminated, the reaction time of the sensing element is decreased and an anticipation factor is introduced whereby the sensing tube leads or anticipates the soil moisture condition during both the watering and drying phases.

BRIEF DESCRIPTION OF THE DRAWINGS

A better understanding of the present invention and its various features and aspects may be gained from the detailed description which follows, taken in conjunction with the accompanying drawings, in which.

DETAILED DESCRIPTION OF THE PREFERRED EMBODIMENTS

Figure 1:
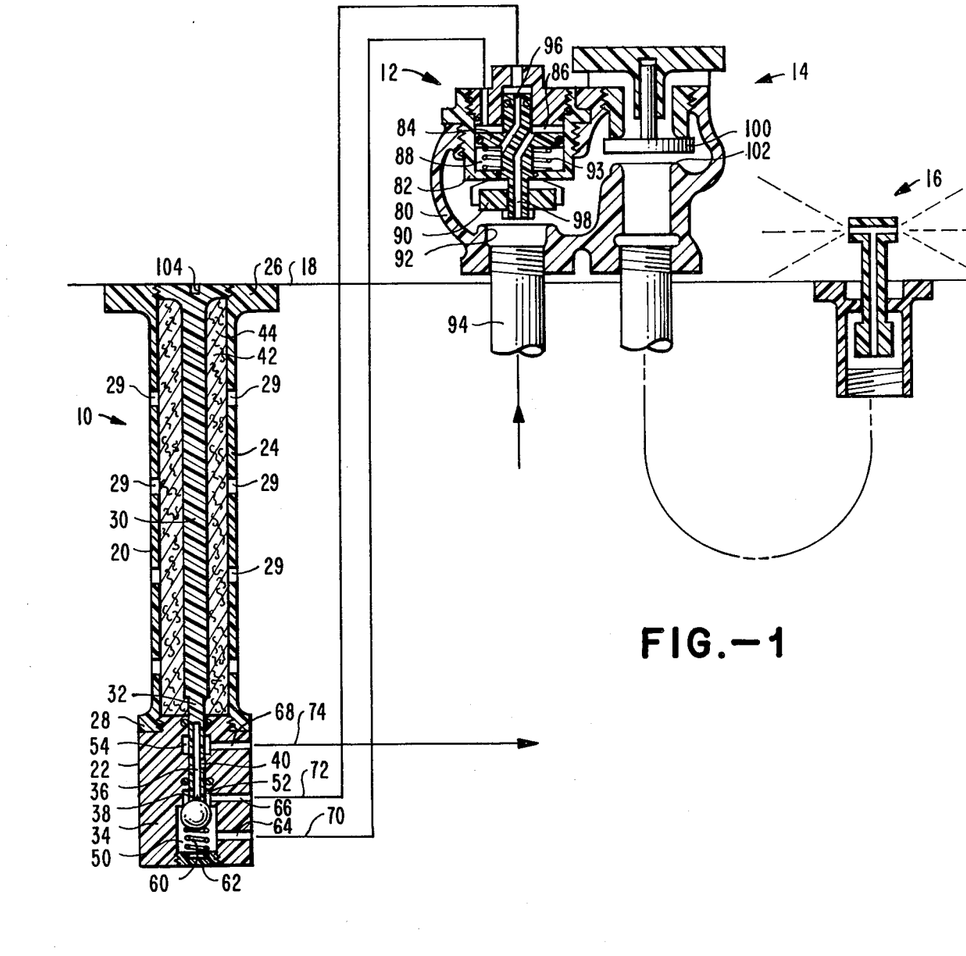
FIG. 1 is an elevation view of a soil irrigation system employing features of the present invention, with the components of the system shown in cross-section.

Referring to FIG. 1 there is shown a soil irrigation arrangement in the form of a lawn sprinkling system comprising generally a moisture-sensing device 10, a shutoff valve 12, an antisiphon valve 14 and a pop-up sprinkler 16 typifying the sprinklers of the system.

The device 10 is embedded in the soil with the upper extremity thereof approximately flush with the ground line 18. The device 10 basically comprises a moisture sensor unit 20 and a pilot valve 22 integrated into a single structural assembly. It will be appreciated, however, that the sensor unit 20 and pilot valve 22 may be independent structures operatively connected by appropriate mechanical elements. Furthermore, although the device 10 is shown as being disposed vertically, the device may be otherwise oriented, for example, horizontally in which case the device is exposed to a more uniform level of soil moisture along its length.

The sensor unit 20 includes a vertically oriented, tubular sensing element 24 whose exterior surface is proximate the soil. The sensing element 24 has a flange 26 at the upper end and a shoulder 28 at the lower end and is internally threaded at each of these ends. The element 24 is perforated, having apertures 29 distributed along its length and about its circumference thereby exposing the interior wall surface of the element essentially the same moisture level as the exterior surface so as to enhance the reaction time of the sensor.

Broadly, the tubular sensing element 24 may be fabricated of any material characterized by dimensional variations that are related to changes in the level of the moisture to which the material is exposed. Such materials typically expand upon absorption of water and contract upon drying. Although a number of materials are known to exhibit this property, several materials have been found to be particularly suitable for use in soil irrigation system sensors of the type herein described and these materials are nylon, cellulose acetate and vulcanized fibers. These materials are not only extremely sensitive to moisture changes but are free of deterioration and have adequate strength even in the thin sections which are required to minimize reaction time. Moreover, sensing elements made of these materials have predictable and repeatable operating characteristics over their entire life spans.

Disposed concentrically within the sensing element 24 is an elongated member or actuator 30 threadedly secured at its upper end to the sensing element 24 adjacent the flange 26. The lower end of the actuator 30 comprises a pushrod 32 received in a sliding fit within a central bore in a pilot valve body 34. The pushrod 32 has an internal, longitudinal bore 36 extending upwardly from a lower tip 38. A port 40 is formed in the wall of the pushrod 32 in communication with the bore 36.

The tubular sensing element 24 and actuator 30 define between them an annular space 42. This space is preferably filled with an absorbent material 44 which assures complete wetting of the interior surface of the element 24 and prevents soil or other debris from entering the space 42 and impeding the movement of the element 24 relative to the actuator 30. The absorbent material 44 may comprise any material which quickly and uniformly absorbs moisture from its surroundings and does not impede the release thereof to a dryer environment. Natural or artificial sponge and chamois are examples of suitable substances for this purpose.

The pilot valve body 34 defines three axially spaced, concentric chambers; a lower chamber 50, an intermediate chamber 52 of somewhat smaller diameter than the lower chamber 50 and in communication therewith, and an upper chamber 54. The lower and intermediate chamber walls define a seat 56 for receiving a ball valve element 58. The valve element 58 is normally biased into engagement with the seat 56 by a spring 60 carried by a threaded plug 62 closing the lower chamber 50. Passages 64, 66 and 68 formed in the pilot valve body 34 communicate respectively with the lower, intermediate and upper chambers. Coupled to the passages 64, 66 and 68 are supply, control and vent lines 70, 72 and 74, respectively.

The supply and control lines 70 and 72 are connected to the shutoff valve 12. The shutoff valve 12 and antisiphon valve 14 form an integral structure conventionally found in residential lawn sprinkler systems. The shutoff valve 12, however, has been modified for operation in response to pressure signals from the moisture-sensing device 10. The valve 12 has a body 80 incorporating in its upper portion a cylinder 82 divided by a piston 84 into upper and lower chambers 86 and 88, respectively. The piston 84 carries at its lower extremity a disk valve element 90 for cooperation with a shutoff valve seat 92 and is biased by a spring 93. Water from a pressurized supply pipe 94 enters through the bottom of the valve 12 when the disk valve element 90 is raised, that is, unseated. A first passage 96 formed within the piston 84 conducts flow from the control line 72 to the lower chamber 88 and a second passage 98 in the piston 84 couples the upper chamber 86 with the supply pipe 94. The piston 84 is spring loaded upwardly, that is, toward the valve open position. The supply line 70 is connected to the valve body 80 in communication with the upper chamber 86.

The anti-siphon valve 14, which is of conventional construction and required in some localities, is coupled to receive water from the shutoff valve 12. The anti-siphon valve 14 which functions as a vacuum breaker in a manner well known in the art, consists primarily of a disk valve element 100 that cooperates with a seat 102. Opening the shutoff valve 12 causes water to flow through the anti-siphon valve 14 and from there through appropriate conduits to the sprinkler 16. The sprinkler 16 is of the conventional pop-up kind and typically a plurality of such sprinklers will be utilized in a single system.

It will be noted that the upper chamber 86 of the shutoff valve 12 is in continuous communication with the pressurized water supply through the second passage 98 so that the supply line 70 is continuously pressurized. The supply line 70 need not, of course, be connected to the water supply through the valve 12 but may alternatively be coupled to such supply at any convenient point.

The vent line 74 may simply comprise a length of tubing, typically several feet long, extending underground from the pilot valve 22.

Figure 2A:
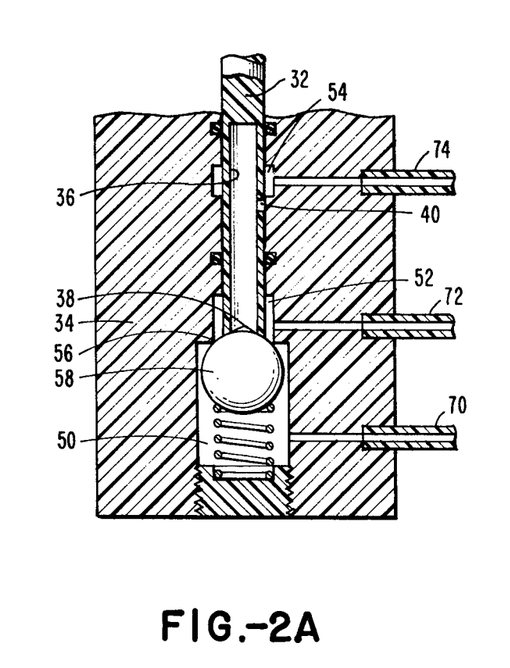
FIGS. 2A–2C are cross-section views of a pilot valve forming part of the system of FIG. 1 and showing the sequence of operation thereof.
Figure 2B:
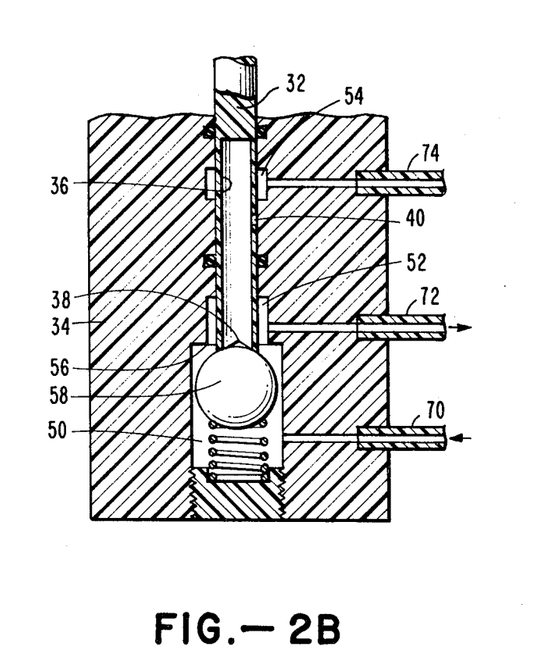

Turning now also to FIGS. 2A–2C, in the description of the operation of the system that follows, it will initially be assumed that a soil drying condition exists so as to cause the sensing element 24 to contract. Such contraction will, of course, be most pronounced in the axial, that is, longitudinal direction and will cause the pilot valve body 34 to be drawn toward the flange 26 at the upper end of the sensing element 24. The length of the actuator 30 remains substantially constant irrespective of the moisture level so that the operation of the pilot valve 22 may be thought of as being occasioned by the displacement of the pilot valve body 34 relative to the pushrod 32. As the valve body 34 continues its upward displacement relative to the pushrod 32, the lower tip 38 of the pushrod eventually makes contact with the ball valve element 58 (FIG. 2A). Further upward displacement of the pilot valve body 34 causes the pushrod 32 to unseat the ball 58 against the force of the spring 60 and the pressure of the water in the lower chamber 50 and to bring the pressurized supply line 70 into communication with the control line 72 (FIG. 2B). The control line 72, like the supply line 70, is preferably in the form of a small diameter tube so that only a small volume of water is required to minimize compressibility effects.

Water from the control line 72 enters the lower chamber 88 of the shutoff valve 12 through passage 96 equalizing the fluid pressures on opposite sides of the piston 84. With the pressures so equalized, the spring 93 and the upward static and dynamic hydraulic forces displace the disc valve element 90 to open the shutoff valve.

It will be appreciated that because of the small volume of water in the control line 72, the relatively small volume defined by the lower chamber 88 of the shutoff valve 12 and the fact that said control line and lower chamber form a closed or "dead" volume, only a minute fluid control volume is required to actuate the shutoff valve 12 to the fully open position. Consequently, as soon as the ball element is displaced from its seat by even a small amount (for example, 0.0001 inch or less) the required fluid control volume is obtained. Thus, there is "snap" action, that is, positive, immediate and full control over the shutoff valve. The shutoff valve is either fully open or completely closed depending upon whether or not the control line is pressurized, the system consequently operating in positive, bistable fashion.

Figure 2C:
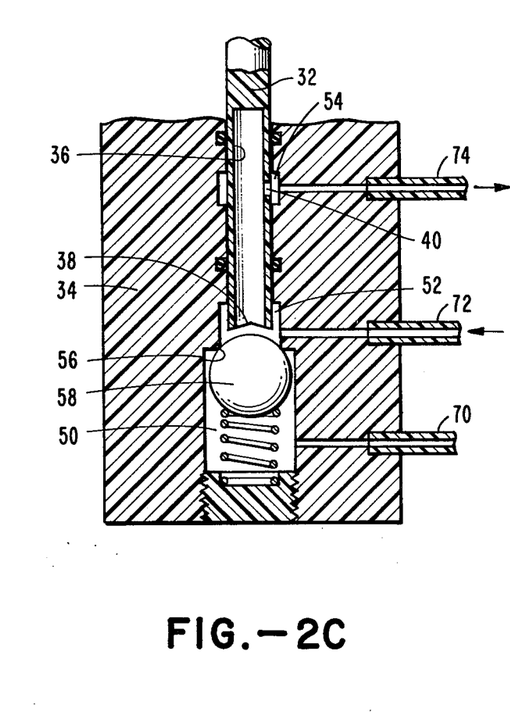

As the soil moisture level increases as a result of irrigation, the tublar sensing element 24 begins to elongate, moving the pilot valve body 34 downwardly in relation to the pushrod 32. Eventually the ball element 58 seats thereby instantly interrupting communication between the control line 72 and pressurized supply line 70. Since the moisture content of the soil surrounding the sensing element 24 continues to rise for a time causing further expansion of the tube, the ball element 58 and pushrod 32 separate (FIG. 2C) and eventually communication is established between control line 70 and vent line 74 through the passage 36 and the port 40. Water in the control line 72 is thereby depressurized terminating the control signal to the shutoff valve 12. Only a minute quantity of water is vented and this is expelled some distance from the sensor unit. Consequently, the vented water has no effect on the sensing element 24.

The instant the control line 72 is depressurized (which typically occurs at the onset of venting), the pressure imbalance across the piston 84 of the shutoff valve 12 causes the piston to be driven down by the pressurized supply water thereby closing the shutoff valve and ending the irrigation period.

The actuator 30 is preferably made of a material which absorbs little or no water and whose dimensions therefore remain essentially unchanged by exposure to moisture. The actuator 30, however, preferably has a coefficient of thermal expansion which is the same, or substantially the same, as the sensing element 24. Temperature variations will therefore cause the element 24 and actuator 30 to expand (or contract) the same amount to render the device temperature compensating. Materials that have been found suitable for fabrication of the actuator 30 include polycarbonate, polystyrene, polyurethane, polypropylene, chlorinated polyether and polyvinyl chloride (PVC).

The dimensions of the various components of the sensor unit and the materials used therein are all controllable criteria and determine the moisture levels at which the pilot valve opens and closes. Nevertheless, fine adjustments may be made in situ to preset the operating limits of the pilot valve by rotating the actuator 30 one way or the other while holding the sensing element 24 stationary and thereby altering the longitudinal position of the actuator 30 relative to the sensing element 24 and pilot valve body 34. An opening 104 for receiving a screwdriver or appropriate wrench is provided in the top of the actuator 30 for this purpose.

It will further be appreciated that a single sensing device 10 can be used to operate a plurality of shutoff valves.

Figure 3:
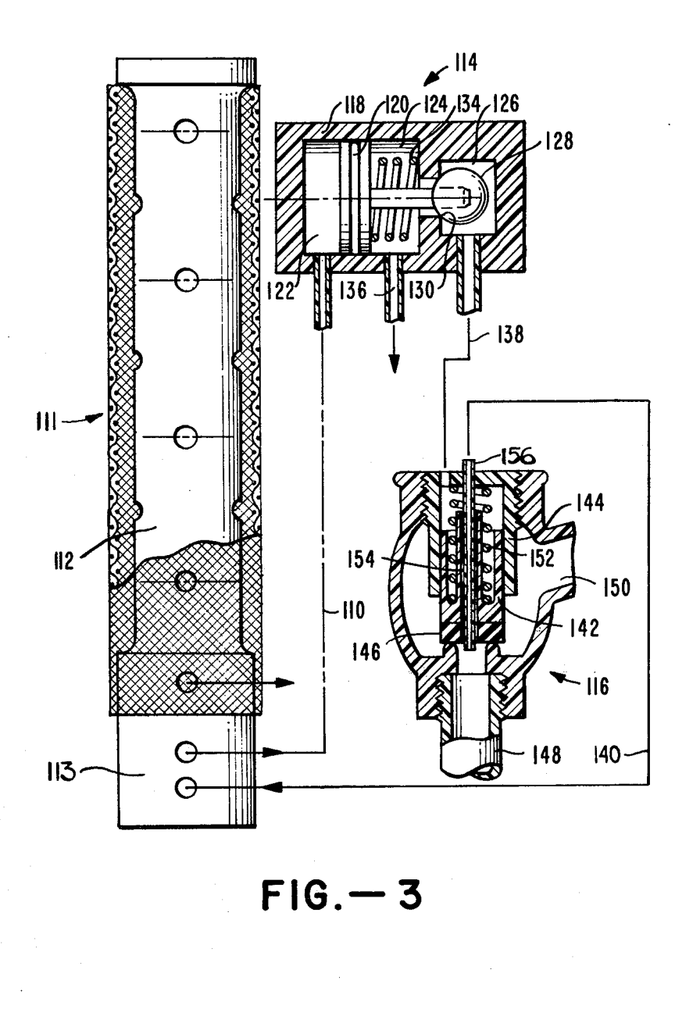
FIG. 3 shows components of an alternative embodiment of the soil irrigation system with portions thereof shown in cross-section.

FIG. 3 shows an alternative embodiment of the invention in which a control line 110 of a moisture sensing device 111, such as that already described and having a sensing tube 112 and pilot valve 113, is coupled to a hydraulic switch 114 which, in turn, is connected to a slave valve 116 comprising the irrigation system shutoff valve. Although the hydraulic switch 114 is shown as a separate element, it may be integrated into the sensing device 111 or slave valve 116 structure. The switch 114 includes a cylinder 118 containing a piston 120 dividing the cylinder into a first chamber 122 to the left of the piston for receiving water from the pilot valve 113 through the control line 110 and a second chamber 124 to the right of the piston. The second chamber 124 is in selective communication with a cavity 126 housing a ball valve 128 movable into and out of engagement with a seat 130 and secured to the piston 120. Alternatively, it is not necessary to attach the ball valve 128 to the piston 120 provided the ball has a relatively close fit with the wall of cavity 126. The piston is biased toward the left by a spring 134 which causes the ball valve 128 to engage the seat 130 to isolate the second chamber 124 from the cavity 126. The second chamber 124 is vented through a line 136 and the cavity 126 is coupled to the valve 116 by pressure line 138.

The slave valve 116 includes a piston 142 slidably received within a cylinder 114 in communication with the cavity 126 through the pressure line 138. The lower face of the piston 142 carries a disk valve member 146 which, when seated as shown, interrupts communication between a sprinkler water pressure supply pipe 148 and a discharge port 150 leading to an anti-siphon valve (not shown). The piston 142 is biased toward the seated position by a spring 152 and may include a longitudinal, annular bleed orifice 154 about a stationary tube 156 secured at its upper end to the cylinder 144. The tube 156 and a pressure line 140 couple the supply pipe 148 with the pilot valve 113.

In the absence of a hydraulic control signal from the pilot valve 113, the piston 120 of the hydraulic switch 114 moves to its leftmost position under urging of the spring 134 and hydraulic pressure transmitted through pipe 148, tube 156 and line 138. In this position the ball valve 128 engages the seat 130. The interior of cylinder 144 of the slave valve 116 is thus in communication with the supply pipe 148 and a pressure balance exists across the piston 142 permitting the spring 152 and hydraulic pressure to force the piston 142 downwardly to seat the disk valve 146. A pressure control signal from the device 111, indicating a dry condition and the need for irrigation, moves the piston 120 of the hydraulic switch 114 to the right thereby venting the volume above the piston 142. The pressure imbalance that results across the piston 142 causes it to be unseated and water flows freely from the pipe 148 through the discharge port 150 to the sprinklers.

Termination of the control flow causes the switch 114 to assume its initial state thereby closing the valve 116. Again, the control flow is fed into a closed or dead volume so that positive, rapid actuation of the switch 114 and valve 116 is obtained.

FIG. 3 also illustrates a modification of the moisture sensing device 111 that has applicability to all of the embodiments of the invention. The device 111 includes a cylindrically shaped screen 157 surrounding the tubular sensing element and preferably attached at its lower end to the pilot valve 113 which has an outer diameter somewhat larger than the outside diameter of the tubular sensing element 112. An annular space 158 is thereby defined between the screen 157 and element 112. The screen 157, although allowing moisture to pass through, prevents entry of soil into the space 158. The tubular sensing element 112 is thereby isolated from, that is, not in direct contact with, the surrounding soil. By positioning the device 111 so that it is within the sprinkling range of one or more of the sprinklers, several advantages are gained. Thus, mechanical friction or binding between the soil and element 112, which may introduce lag or hysteresis into the operation of the sensing device 111, is eliminated. The reaction time of the device 111 is also decreased. The space 158 quickly fills with water when the system turns on. The tubular element 112 responds to this immersion to turn off the system at the end of a period of time governed, among other things, by the tubular sensing element material and dimensions. By employing the described isolation principle, the device 111 moreover anticipates the soil moisture condition during both the drying and watering phase based on the fact that the rates of moisture change are different for the soil and the space 158. The tubular element 112 not only dries faster during the drying phase when surrounded by the space 158 but is exposed more rapidly to a higher moisture level during the watering phase.

A specific, practical example of a moisture sensor unit in accordance with the present invention employs a ¾ inch diameter sensing tube about 6 inches long with a wall thickness of about 0.012 inch. Wall thickness less than about 0.010 inch introduce errors because of deflection or warping produced by mechanical stresses. On the other hand, if the wall thickness is too great, for example, more than about 0.012 inch, excessive lag occasioned by the increased time required for the sensing tube to absorb moisture, results. The sensing tube is made of Type 6 general purpose nylon while the actuator is a ½ inch diameter polycarbonate rod. A sensing tube having the aforementioned characteristics is capable of a total longitudinal elongation in excess of 0.1 inch from the dry to the almost completely saturated state. Such total elongation is, of course, much greater than the approximately 0.002 inch sensor tube movement required to displace the pilot valve from the position in which it just beings to open to the vented position, and vice-versa. This small initial displacement takes place within a few minutes following an increase of moisture content. The sensitivity of the described, exemplary sensing tube may be viewed from another standpoint, namely, the amount of elongation in terms of changes in relative humidity. Such elongation for a 6 inch sensing tube is approximately 0.001 inch for each 1 percent change in relative humidity. Thus, with pilot valve actuation requiring only about 0.002 inch displacement, the system is sensitive to 2 percent changes in relative moisture content.

Figure 4:
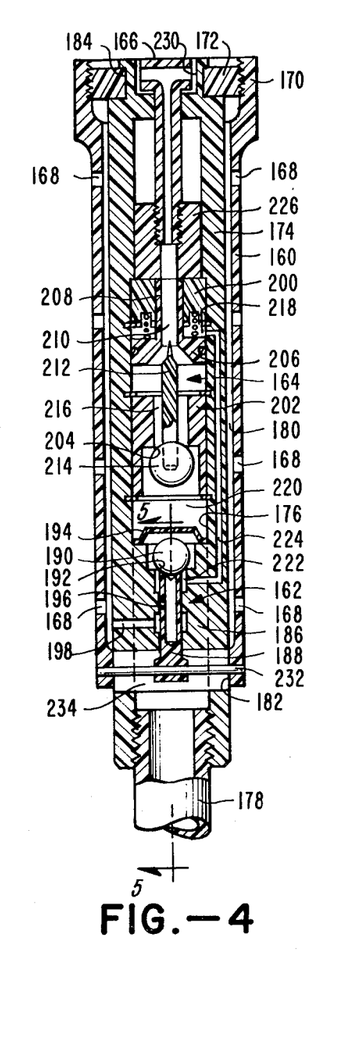
FIG. 4 is a cross-section view, in elevation, of a soil irrigation device pursuant to another aspect of the invention.
Figure 5:
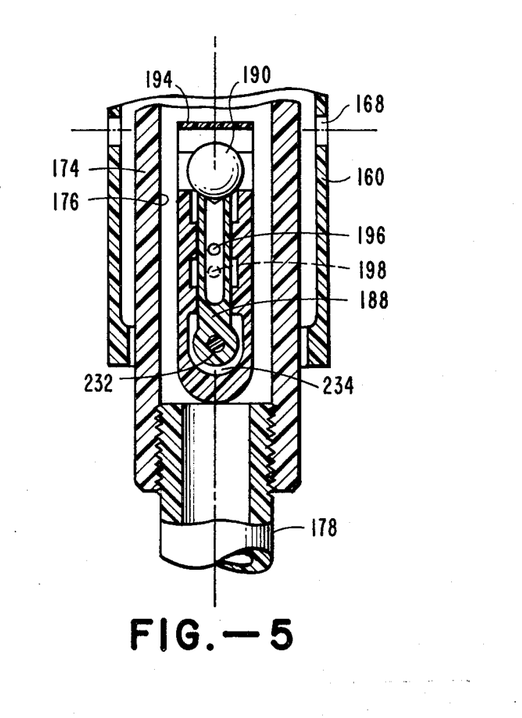
FIG. 5 is a cross-section view, in elevation, of a portion of the device of FIG. 4 as taken along the plane 5—5.

Turning now to FIGS. 4 and 5 there is shown a soil irrigation device incorporating into a single compact structure a tubular sensing element 160, a pilot valve 162, a shutoff valve 164 and a pop-up sprinkler head 166. The sensing element 160, which has perforations 168 to expose the interior surface of the element 160 to the moisture changes, is enlarged at its upper end to form a flange 170 having internal threads engaging an adjusting collar 172.

The sensing element 160 encloses a cylindrical housing 174 concentric with the sensing element 160 and having a central longitudinal bore 176 extending substantially the entire length of the housing. A water supply pipe 178 is threadedly secured to the lower extremity of the housing in communication with the lower portion of the bore 176. The outside diameter of the housing 174 is somewhat smaller than the inside diameter of the sensing element 160 so as to define an annular space 180 which may be substantially filled with an absorbent material such as that discussed in connection with the moisture sensing device of FIG. 1. The sensing element 160 is free to expand and contract longitudinally relative to the housing and a guide surface 182 may be provided at the lower extremity end of the sensing element to ride in light contact with the housing 174.

The upper extremity of the housing 174 has an external groove 184 receiving the adjusting collar 172 in a sliding fit. It will be seen that rotation of the collar in one direction or the other causes the sensing element 160 to be displaced up or down in relation to the housing 174. Fine adjustments of the unit after installation are thus made possible in the same manner as discussed earlier in connection with FIG. 1 and effectively predetermine the moisture levels at which the pilot valve is opened and closed.

A web 186 extending across the lower portion of the bore 176 encases the pilot valve 162 which comprises a hollow pushrod 188 and a ball valve 190 cooperating with a seat 192. The ball valve is retained within a cage 194. With the exception of its inverted disposition, the pilot valve 162 is essentially identical to that of FIG. 1 and operates in the same fashion. Thus, the pushrod 188 is provided with a port 196 for conducting water to a vent opening 198 in the side of the housing when the pushrod 188 is retracted from the ball valve element 190. A vent line (not shown) may be connected to the opening 198.

Also contained within the bore of the housing 174 is a fixed guide block 200 and a fixed plug 202 having a stepped central bore of defining a shutoff valve seat 204. Between the guide block 200 and plug 202 is a spring loaded piston 206 having an extension 208 received in a sliding fit by the guide block 200. A passage 210 extends the entire length of the piston 206 and extension 208. Depending from the piston 206 is a connecting rod 212 projecting into the plug 202 and carrying at its lower end a ball valve element 214 adapted to engage the valve seat 204. The bore of the plug is of adequate diameter so as to define an annular passageway 216 about the connecting rod.

An upper chamber 218 is defined between the upper surface of the piston 206 and the lower surface of the guide block 200 and a lower chamber 200 is defined between the web 186 and the plug 202. Below the seat 204 is an annular cavity 222 connected to the upper chamber 218 by a small conduit 224 formed in the wall of the housing 174. Above the guide block 200 is a piston 226 having a central threaded aperture receiving the T-shaped pop-up sprinkler head 166. The sprinkler head and piston assembly 166, 266 is free to more up and down within the upper portion of the housing bore 176 and in its lowermost position, the sprinkler head 166 is retracted within a recess 230 formed in the upper extremity of the housing 174.

A cross pin 232 is connected to the lower end of the sensing tube 160 and extends across a diameter thereof through the lower end of the pushrod 188. The cross pin 232 passes through an elongated opening of slot 234 formed in the web.

The housing 174 may be made of material, such as polycarbonate, that is not affected by moisture and has the same, or substantially the same, coefficient of thermal expansion as the sensing element material which may be nylon or other materials as previously mentioned.

In the operation of the device shown in FIGS. 4 and 5, the lower chamber 220, which is in continual communication with the supply pipe 178, contains water supply pressure at all times. Longitudinal contraction of the sensing element 160 displaces the lower end of the sensing element and attached pushrod 188 upwardly in relation to the housing 174. Eventually the ball valve element 190 is dislodged from its seat bringing the lower chamber 220 into communication with the conduit 224, which serves the same function as the control line of previously described embodiments, and conducts water under pressure into the upper chamber 218. Because of the area differential across the piston 206, the piston 206 is pushed downwardly unseating the ball valve element 214 permitting water to enter the annular passageway 216 and flow upwardly through the passage 210 in the piston and its extension, and into the uppermost portion of the housing bore 176 containing the sprinkler head assembly. The resulting pressure drives the sprinkler head assembly upwardly to the sprinkling position with water issuing from the T-shaped head 228.

Expansion of the tubular sensing element 160 moves the pushrod 188 downwardly eventually drawing it away from the reseated ball valve element 190. Further retraction of the pushrod 188 causes the port 196 to communicate with the vent opening 198 thereby depressurizing the upper chamber 218 through the conduit 224. The piston 206 returns to its uppermost position in which the ball valve 214 is once again engaged against the seat 204 thereby shutting off the supply to the sprinkler.

Figure 6:
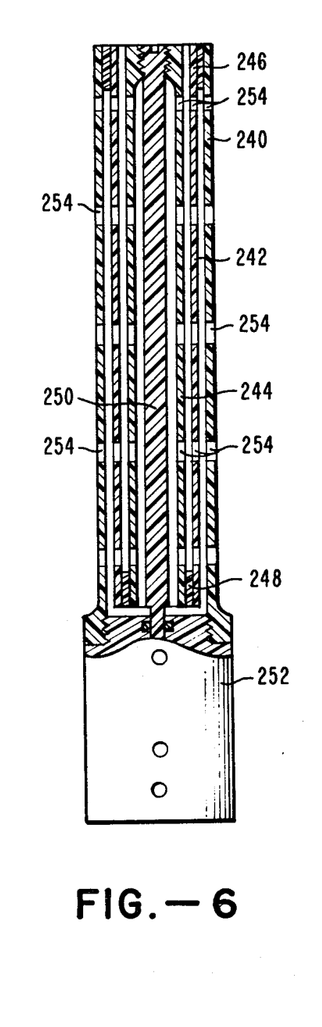
FIG. 6 is a cross-section view, in elevation, of a moisture sensing element of a soil irrigation device in accordance with another embodiment of the invention.

It will be appreciated that the total elongation of the tubing sensing element is a function of the sensing element length. In some installations, it may be desirable to employ a sensor unit having a relatively small overall length yet in which high sensitivity and substantial total elongation must still be provided. The embodiment of FIG. 6 responds to these requirements. FIG. 6 shows a multiple sensing element device including an outer sensing tube 240 similar to those already described, an intermediate support tube 242 of polycarbonate or the like which is insensitive to moisture and an inner sensing tube 244. The upper ends of the outer sensing tube 240 and support tube 242 are connected by a spacer ring 246. A similar ring 248 connects the lower ends of the support tube 242 and inner sensing tube 244. The inner sensing tube 244 is threadedly secured to a centrally disposed actuator rod 250. The outer sensing tube 240 is threadedly secured at its lower end to a pilot valve 252 which may be the same as that shown in FIG. 1 and cooperates with the outer sensing tube 240 and actuator rod 250 in the same fashion. Each of the tubes 240, 242 and 244 has perforations 254 so that the interior and exterior surfaces of both sensing tubes 240, 244 are exposed to essentially the same moisture level at any given time. Again, absorbent material (not shown) may be disposed in the annular spaces defined between the sensing and support tubes and actuator rod.

In operation, using the upper extremity of the outer sensing tube as a reference, it will be seen that a drying condition causes contraction of both the inner and outer sensing tubes 240 and 244. Contraction of the outer sensing tube 240 tends to draw the pilot valve body upwardly while contraction of the inner tube 244 will tend to move the actuator rod 250 downwardly. These motions are additive so that approximately twice the displacement is possible from this sensor unit for a given overall length. More than two sensor tubes may, of course, be used to acquire even greater displacement multiplication.

Figure 7:
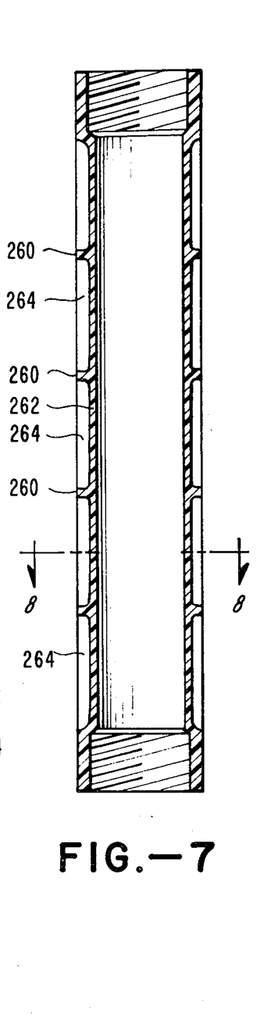
FIG. 7 is a cross-section view, in elevation, of the moisture sensing element of a soil irrigation device pursuant to still another embodiment of the invention.
Figure 8:
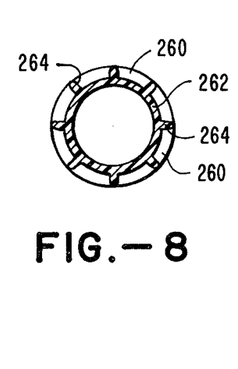
FIG. 8 is a typical transverse cross-section of the element of FIG. 7 as taken along the plane 8—8.

The materials which have been found according to one feature of the invention to be particularly suitable for use as sensing elements, namely, nylon, cellulose acetate and vulcanized fiber, all lose their structural strength and rigidity to some extent when they absorb moisture. This is a limitation on the thinness of the wall of the sensing tube. FIGS. 7 and 8 show reinforcing which may be applied to sensing tubes of the present invention when made in exceedingly thin sections. Thus, circular ribs 260 projecting from the exterior surface of a sensing tube 262 and spaced about one inch apart may be formed integrally with the tube. In addition, several axial ribs 264 may also be employed. The thickness of such ribs may be of the order of 0.015 inch, by way of example.

Various modifications in the moisture responsive apparatus of the present invention will occur to those skilled in the art without departure from the scope of the invention. For example, the pistons in the various embodiments described herein may be replaced by diaphragms without altering the principles involved.

What is claimed is:

1. A moisture responsive sensor unit comprising:
   a tubular moisture responsive sensing element having a first end and a second end, said sensing element being expansible longitudinally as a function of the amount of moisture absorbed by said element; and
   an actuator, at least a portion of which is disposed within said sensing element, having a first end coupled to the first end of said sensing element and a second end, the dimensions of said actuator being substantially unaffected by moisture, said second ends of said sensing element and said actuator being adapted to be coupled to relatively displaceable portions of a hydraulic control signal generating means.

2. A moisture responsive sensor unit, as defined in claim 1, in which:
   said tubular sensing element has a thin, perforated wall, said perforations exposing the interior surface of said sensing element to substantially the same moisture levels as the exterior surface thereof.

3. A moisture responsive sensor unit, as defined in claim 2, in which:
   said tubular sensing element and actuator define an annular space between them, absorbent material substantially filling said annular space.

4. A moisture responsive sensor unit, as defined in claim 2, in which:
   said tubular sensing element is fabricated of a material from the group consisting of nylon, cellulose acetate and vulcanized fiber.

5. A moisture responsive sensor unit, as defined in claim 1, in which:
   said tubular sensing element comprises a plurality of sensing tubes disposed in concentric relationship, the innermost tube including said first end and the outermost tube including said second end, adjacent tubes being separated by tubular support means unaffected dimensionally to moisture, said support means being connected to opposed ends of adjacent sensor tubes whereby the total relative displacement of said portions of said control signal generating means is increased in relation to the number of sensor tubes employed.

6. A moisture responsive sensor unit, as defined in claim 1, in which:
   said sensing element has reinforcements comprising a plurality of spaced ribs projecting from the external surface of said elements.

7. A moisture responsive sensor unit, as defined in claim 1, in which:
   the position of said actuator is adjustable relative to said sensing element to predetermine the relative positions of said second ends.

8. A moisture responsive sensor unit, as defined in claim 1, in which:
   said sensing element and said actuator having substantially the same coefficients of thermal expansion.

9. A moisture responsive control device comprising:
   a tubular element adapted to be placed in proximity to the material whose moisture content is to be controlled, said element being expansible in relation to said moisture content and having first and second ends;
   a reference element having a first end attached to said first end of said tubular element, and a second end, said reference element being substantially unaffected dimensionally by moisture; and
   pilot valve means for controlling a moisture addition system and having relatively movable pilot valve portions, one of said pilot valve portions being secured to the second end of said tubular element and the other of said pilot valve portions being secured to the second end of said reference element, expansion and contraction of said tubular element relative to said reference element operating said pilot valve means between open and closed positions.

10. A moisture responsive control device, as defined in claim 9, in which:
    said tubular element is perforated to expose the inner wall surface of said tubular element to said moisture thereby decreasing the reaction time of said element.

11. A moisture responsive control device, as defined in claim 9, in which:
    said reference element is disposed within said tubular element.

12. A moisture responsive control device, as defined in claim 9, in which:
    said device includes a moisture-permeable screen disposed about said tubular element but out of contact therewith to define an annular space about said tubular element and isolate said element from direct contact with the material whose moisture content is to be controlled.

13. A device for use in an irrigation system for automatically controlling the moisture content of the soil, comprising a pilot valve for providing a hydraulic control signal for operating valve means in said irrigation system; and means for operating said pilot valve including a moisture sensing element adapted to be placed in moisture sensing relationship with said soil and whose dimensions vary in response to the level of moisture sensed, a member substantially unaffected dimensionally by moisture coupled to said sensing means, said pilot valve being operable in response to dimensional variations of said sensor relative to said member;

said sensing element having a tubular configuration, and said member being at least partly enclosed within said tubular sensing element.

14. A device, as defined in claim 13, in which:

said tubular sensing element is perforated to expose the interior surface of said element to essentially the same moisture level as the exterior surface of said element.

15. A device, as defined in claim 14, said tubular sensing element and member define an annular space between them, said space being substantially filled with a moisture absorbing material.

16. A device for use in an irrigation system for automatically controlling the moisture content of the soil, comprising a pilot valve for providing a hydraulic control signal for operating valve means in said irrigation system; and means for operating said pilot valve including a moisture sensing element adapted to be placed in moisture sensing relationship with said soil and whose dimensions vary in response to the level of moisture sensed, a member substantially unaffected dimensionally by moisture coupled to said sensing means, said pilot valve being operable in response to dimensional variations of said sensor relative to said member;

said sensing element comprising a thin-walled tube made of a material selected from the group consisting of nylon, cellulose acetate and vulcanized fiber.

17. A device for use in an irrigation system for automatically controlling the moisture content of the soil, comprising a pilot valve for providing a hydraulic control signal for operating valve means in said irrigation system; and means for operating said pilot valve including a moisture sensing element adapted to be placed in moisture sensing relationship with said soil and whose dimensions vary in response to the level of moisture sensed, a member substantially unaffected dimensionally by moisture coupled to said sensing means, said pilot valve being operable in response to dimensional variations of said sensor relative to said member;

said sensing element and said member having substantially the same co-efficient of thermal expansion.

18. A device for use in an irrigation system for automatically controlling the moisture content of the soil, comprising a pilot valve for providing a hydraulic control signal for operating valve means in said irrigation system;

means for operating said pilot valve including a moisture sensing element adapted to be placed in moisture sensing relationship with said soil and whose dimensions vary in response to the level of moisture sensed, a member substantially unaffected dimensionally by moisture coupled to said sensing means, said pilot valve being operable in response to dimensional variations of said sensor relative to said member; and a moisture-permeable screen disposed about said sensing element to define with said element an annular space isolating said soil from direct contact with said element.

19. A moisture responsive device for controlling the operation of a soil irrigation system, comprising:

a pilot valve comprising a pilot valve body enclosing a movable valve element, said pilot valve having an inlet for connection to a supply of water under pressure and an outlet for providing a hydraulic pressure control signal, said valve element being disposed in conduit means interconnecting said inlet and outlet, said valve element being normally biased to a position interrupting communication between said inlet and outlet; and a moisture sensor for operating said pilot valve, said sensor including (i) a tubular sensing element having a first end and a second end and adapted to be disposed in moisture-sensing relationship with said soil and expansible longitudinally in relation to the moisture content of said soil, said second end being secured to said pilot valve body, and (ii) an actuator, dimensionally stable in the presence of moisture, disposed at least partially within said tubular sensing element and having a first end coupled to said first end of said sensing element and a second end in operative relationship with said movable valve element, contraction of said sensing element to a predetermined length causing said valve element to be moved by said actuator to establish communication between said inlet and outlet.

20. A device, as defined in claim 19, in which:

said sensing element and said actuator have substantially the same coefficient of thermal expansion.

21. A device, as defined in claim 19, in which:

said sensing element is made of a material selected from the group consisting of nylon, cellulose acetate and vulcanized fiber.

22. A device, as defined in claim 19, in which:

said tubular sensing element and said actuator define an annular space between them, said tubular sensing element being perforated to conduct moisture to and from said annular space, an absorbent material substantially filling said annular space.

23. A device, as defined in claim 19, in which:

said device further includes a moisture-permeable screen disposed about said tubular sensing element but out of contact therewith to define an annular, soil isolation space about said sensing element.

24. A device, as defined in claim 19, in which:

said actuator is adjustably coupled to said sensing element whereby the points at which said pilot valve opens and closes may be preadjusted.

25. A device, as defined in claim 19, in which:
said sensing element comprises a plurality of concentric, coextensive, perforated sensing tubes, adjacent sensing tubes being connected to a perforated support tube dimensionally unaffected by moisture and interposed between said adjacent tubes, alternate ends of adjacent tubes being connected to said interposed support tube, whereby the movement of said actuator relative to said second end of said sensing element is amplified in accordance with the number of sensing tubes employed.

26. A device, as defined in claim 25, in which:
said sensing tubes, each support tube and said actuator have substantially the same coefficient of thermal expansion.

27. A device, as defined in claim 19, in which:
said movable pilot valve element comprises a ball element and said second end of said actuator includes a hollow push rod having a port in the side wall thereof and a tip adapted to engage said ball element, said pilot valve body having a vent, withdrawal of said push rod tip from said ball element bringing said outlet in said pilot valve body into communication with said vent through said hollow push rod and port.

28. A device, as defined in claim 19, in which said tubular sensing element has reinforcing ribs projecting from the exterior surface thereof.

29. Apparatus for automatically controlling the moisture content of soil comprising:
valve means operable by a small volume, hydraulic pressure control signal to supply water to a system for irrigating said soil;
a pilot valve coupled to said valve means, said pilot valve being adapted to selectively provide said control flow from a source of pressurized water; and
means coupled to said pilot valve for operating said pilot valve, said last-mentioned means including a moisture sensor unit adapted to be placed in moisture sensing relationship to said soil, said unit comprising (i) a tubular sensing element expandable longitudinally as a function of the amount of moisture absorbed by said sensing element and (ii) a member coupled to said sensing element and at least partially enclosed thereby, said member being substantially unaffected dimensionally by moisture, predetermined variations in the length of said sensing element relative to said member operating said pilot valve.

30. Apparatus, as defined in claim 29, in which:
said valve means includes a hydraulic switch and an irrigation system shutoff valve, said switch having a pressure responsive element responsive to said hydraulic control signal, an inlet for connection through said shutoff valve to a supply of pressurized water and a vent, said pressure responsive element normally interrupting communication between said inlet and vent, said shutoff valve having an inlet adapted for connection to said pressurized supply, a first outlet adapted for connection to said hydraulic switch inlet, a second outlet adapted for connection to said irrigation system and pressure responsive means normally interrupting communication between said inlet and second outlet of said shutoff valve, the presence of said control signal displacing said pressure responsive element of said switch to establish communication between said inlet and vent of said shutoff valve to create a pressure imbalance across said pressure responsive element of said shutoff valve whereby communication between said inlet and second outlet of said shutoff valve is established.

31. Apparatus, as defined in claim 29, in which:
said member comprises a housing having a bore adapted to be coupled to said source of pressurized water and carrying said valve means and pilot valve and wherein said pilot valve has a movable valve element and said sensing element has a free end movable relative to said housing in accordance with the moisture absorbed by said element, said free end being adapted to displace said movable valve element upon contraction of said sensing element to a predetermined length and establish said control signal.

32. Apparatus, as defined in claim 29, in which:
said pilot valve comprises a pilot valve body enclosing a movable valve element, said pilot valve body having an inlet for connection to said source of pressurized water and an outlet for providing said hydraulic control signal, displacement of said movable valve element selectively establishing communication between said inlet and outlet and wherein said member comprises an actuator rod having a portion adapted to displace said movable element.

33. Apparatus, as defined in claim 29, in which:
said tubular sensing element and said member are adjustably coupled.

34. Apparatus, as defined in claim 29, in which:
said sensing element and said member have substantially the same coefficient of thermal expansion.

35. Apparatus, as defined in claim 29, in which:
said sensing element has interior and exterior surfaces and is perforated to expose said interior surface to substantially the same moisture levels as the exterior surface.

36. Apparatus, as defined in claim 35, in which:
said sensing element and said member define between them an annular space, said space containing absorbent material.

37. Apparatus, as defined in claim 29, in which:
said moisture sensing unit further includes a moisturepermeable screen disposed about said tubular sensing element to define an annular soil isolation space about said sensing element.

38. A moisture responsive, soil irrigating apparatus comprising:
a cylindrical housing substantially unaffected dimensionally by moisture, said housing having an internal, longitudinally extending bore, an upper end and a lower end, said lower end being adapted for connection to a supply of pressurized water, said housing further including a vent opening;
a perforated, tubular moisture sensing element disposed about said housing in concentric relationship therewith, said tubular element having an upper end adjustably secured to the upper end of said housing and a lower, free end, said sensing element being expandable longitudinally as a function of the amount of moisture absorbed by said sensing element;
a pilot valve carried by said housing within said bore, said pilot valve including a movable ball valve element and a longitudinally extending, hollow push rod having (i) a port in the side wall thereof, (ii) an upper tip adapted to engage and displace said ball element off a seat and (iii) a lower end connected to the lower, free end of said sensing element, said push rod being movable vertically relative to said housing in response to the longitudinal expansion and contraction of said sensing element, said pilot valve including a cavity below said ball valve element;

a shutoff valve carried in said bore of said housing, said shutoff valve including a piston movable in a guide block, said piston and guide block defining between them an upper chamber in said bore, said shutoff valve and pilot valve defining between them a lower chamber in said bore, said lower chamber being in continuous communication with said lower end of said housing, a conduit connecting said cavity in said pilot valve and said upper chamber, unseating of said ball valve element establishing communication between said lower chamber and said cavity; and a pop-up sprinkler head carried in the upper portion of said bore above said shutoff valve, contraction of said sensing element to a predetermined length unseating said ball element to open said pilot valve and said shutoff valve to establish communication between said upper portion of said bore and said lower chamber whereby said sprinkler head is raised and water discharged therefrom, elongation of said sensing element to a predetermined length closing said pilot valve, further elongation of said sensing element causing withdrawal of said push rod from said ball element and establishing communication between said passage and said vent opening via said port and hollow interior of said push rod whereby water in said passage is vented and depressurized, said shutoff valve thereby closing to terminate the sprinkling cycle.

39. A moisture responsive sensor unit, comprising:
an elongated moisture sensing element adapted to expand in accordance with increasing amounts of moisture and to contract in accordance with reducing amounts of moisture thereat, and
an elongated actuator having one end coupled to an end of said sensing element for movement therewith, the dimensions of said actuator being substantially unaffected by moisture whereby the amount of moisture present at said sensing element is indicated by the relative displacement of the free ends of said sensing element and said actuator, said sensing element being fabricated of a material from the group consisting of nylon, cellulose acetate and vulcanized fiber.

40. A moisture responsive sensor unit as described in claim 39 and wherein said free ends of said sensing element and said actuator are operatively connected to a means for generating a hydraulic signal in accordance with said relative displacement of said free ends.

41. A moisture responsive sensor unit as described in claim 39 and wherein said sensing element has a thin wall formed to permit access of the moisture to both sides thereof.

42. A moisture responsive sensor unit as described in claim 41 and wherein said wall has a thickness of from about 0.010 inch to about 0.012 inch.

43. A moisture responsive sensor unit as described in claim 39 and wherein said actuator is fabricated of a material from the group consisting of polycarbonate, polystyrene, polyurethane, polypropelene, chlorinated polyether, and polyvinyl chloride.

44. A moisture responsive sensor unit as described in claim 39 and wherein means is provided in the coupling between said sensing element and said actuator for adjusting said relative displacement of their said free ends.

45. A moisture responsive sensor unit as described in claim 40 and wherein said sensing element and said actuator are fabricated of materials having substantially the same coefficients of thermal expansion whereby said relative displacement of said free ends thereof in accordance with the amount of moisture present is substantially unaffected by temperature.

46. A moisture responsive sensor unit as described in claim 40 and wherein said sensing element and said actuator and said means for generating a hydraulic signal are incorporated in a unitary assembly.

47. A moisture responsive sensor unit as described in claim 40 and wherein said means for generating a hydraulic signal is connected to a hydraulic actuator capable of operation in response to said hydraulic signal.

48. A moisture responsive sensor unit as described in claim 47 and wherein said hydraulic actuator is coupled to an irrigation valve and sprinkler means so as to open said valve and supply water to said sprinkler when moisture at said sensing element falls below a predetermined amount, and to close said valve when moisture at said sensing element exceeds a predetermined amount.

49. A moisture responsive sensor unit as described in claim 48 and wherein said hydraulic actuator is formed to cause rapid opening and closing of said valve.

50. A moisture responsive sensor unit as described in claim 39 and wherein said hydraulic generating means comprises pilot valve means adapted for connection to a source of fluid under pressure and having relatively movable valve member and valve seat portions, one of said portions being operatively connected to said free end of said sensing element for movement therewith, and the other of said portions being operatively connected to said free end of said actuator for movement therewith.

51. Automatic demand soil irrigation apparatus, comprising
a sprinkler valve adapted for connection to a source of water under pressure,
a sprinkler connected to said sprinkler valve to be supplied water therefrom when the latter is open,
a hydraulic actuator operatively connected to open and close said sprinkler valve,
a pilot valve adapted for connection to the source of water under pressure and to said hydraulic actuator for selectively supplying water under pressure thereto to open said sprinkler valve and for venting water therefrom to close said sprinkler valve,
and a moisture sensor unit adapted to be placed in moisture sensing relationship with the soil and operatively connected to said pilot valve for controlling same.

52. Automatic demand soil irrigation apparatus as described in claim 51 and wherein said moisture responsive sensor unit comprises an elongated moisture sensing element adapted to expand in accordance with increasing amounts of moisture and to contract in accordance with reducing amounts of moisture thereat, and an elongated actuator having one end coupled to an end of said sensing element for movement therewith, the dimensions of said actuator being substantially unaffected by moisture whereby the amount of moisture present at said sensing element is indicated by the relative displacement of the free ends of said sensing element and said actuator.

53. Automatic demand soil irrigation apparatus as described in claim 51 and wherein said moisture responsive sensor unit comprises:
  a tubular moisture responsive sensing element having a first end and a second end, said sensing element being expandable longitudinally as a function of the amount of moisture absorbed by said element; and
  an actuator, at least a portion of which is disposed within said sensing element, having a first end coupled to the first end of said sensing element, and a second end, the dimensions of said actuator being substantially unaffected by moisture, said second ends of said sensing element and said actuator being adapted to be coupled to relatively displaceable portions of a hydraulic control signal generating means.

54. A pilot valve construction, comprising
  a housing providing a chamber adapted for connection to a source of liquid under pressure,
  a valve seat across an end of said chamber,
  a ball valve member movable in said chamber toward and away from said valve seat,
  a tubular stem slidably mounted in said housing for axial movement to displace said ball from said seat, and
  spring means urging said ball against said seat,
  said housing having a first passage downstream of said valve seat and adapted for connection to a hydraulic device for transmitting liquid under pressure thereto when said ball is displaced from said seat,
  said housing having a second passage adapted for venting liquid therefrom, said tubular stem being formed for blocking off said second passage when said stem is displacing said ball from said valve seat and having an opening therethrough for communicating said first passage with said second passage when said stem is not displacing said ball from said valve seat.

55. In an irrigation system having a supply conduit for water under pressure,
  a slave valve mounted in said conduit for controlling the flow of water therethrough,
  a hydraulic actuator for said slave valve,
  a pilot valve formed for selectively supplying liquid under pressure to said hydraulic actuator for opening and closing said slave valve,
  and a moisture responsive sensor formed for operating said pilot valve to effect opening of said slave valve when the moisture content of the soil falls below a predetermined amount and to effect closing of the slave valve when the moisture content of the soil exceeds a predetermined amount,
  said pilot valve comprising:
    a housing providing a chamber adapted for connection to a source of liquid under pressure,
    a valve seat across an end of said chamber,
    a ball valve member movable in said chamber toward and away from said valve seat,
    a tubular stem slidably mounted in said housing for axial movement to displace said ball from said seat,
    spring means urging said ball against said seat,
    said housing having a first passage downstream of said valve seat and adapted for connection to a hydraulic device for transmitting liquid under pressure thereto when said ball is displaced from said seat,
    said housing having a second passage adapted for venting liquid therefrom,
    said tubular stem being formed for blocking off said second passage when said stem is displacing said ball from said valve seat and having an opening therethrough for communicating said first passage with said second passage when said stem is not displacing said ball from said valve seat.

56. A pilot and slave valve construction, comprising:
  a pilot valve housing providing a chamber adapted for connection to a source of liquid under pressure,
  a valve seat across an end of said chamber,
  a ball valve member movable in said chamber toward and away from said valve seat,
  a tubular stem slidably mounted in said housing for axial movement to displace said ball from said seat,
  spring means urging said ball against said seat,
  said pilot valve housing having a first passage downstream of said valve seat and adapted for connection to a slave valve for transmitting liquid under pressure thereto when said ball is displaced from said seat,
  said pilot valve housing having a second passage adapted for venting liquid therefrom,
  said tubular stem being formed for blocking off said second passage when said stem is displacing said ball from said valve seat and having an opening therethrough for communicating said first passage with said second passage when not displacing said ball from said valve seat,
  a slave valve housing,
  a slave valve seat in said slave valve housing,
  a slave valve member movable toward and away from said slave valve seat,
  a slave valve stem axially reciprocable in said slave valve housing and secured to said slave valve member for joint movement therewith,
  a cylindrical chamber in said slave valve housing coaxially containing a portion of said slave valve stem,
  a piston on said slave valve stem in said cylindrical chamber,
  said slave valve member and said slave valve stem and said piston having a passage therethrough for communicating the end of said cylindrical chamber remote from said slave valve member with liquid under pressure passing through said slave valve seat,
  said slave valve stem and said piston being formed with a passage therethrough for communicating the end of said cylindrical chamber adjacent to said slave valve member with the end of said slave valve stem remote from said slave valve member,
  spring means in said cylindrical chamber urging said slave valve member away from said slave valve seat,
  a first conduit communicating said first passage in said pilot valve housing with said end of said slave valve stem remote from said slave valve member,
  and a second conduit communicating said chamber in said pilot valve housing with said first named end of said cylindrical chamber in said slave valve housing.

* * * * *